(12) United States Patent
Vortmeyer et al.

(10) Patent No.: US 8,393,632 B2
(45) Date of Patent: Mar. 12, 2013

(54) TOWING DEVICE FOR A TOWING VEHICLE

(75) Inventors: Jens Vortmeyer, Preussisch Oldendorf (DE); Michael Klank, Osnabrück (DE); Peter Hofmann, Gauting (DE); Joachim Spratte, Osnabrueck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/500,380

(22) PCT Filed: Oct. 27, 2010

(86) PCT No.: PCT/DE2010/050081
§ 371 (c)(1),
(2), (4) Date: May 10, 2012

(87) PCT Pub. No.: WO2011/050796
PCT Pub. Date: May 5, 2011

(65) Prior Publication Data
US 2012/0217726 A1    Aug. 30, 2012

(30) Foreign Application Priority Data
Oct. 28, 2009  (DE) .......................... 10 2009 046 113

(51) Int. Cl.
*B60D 1/06* (2006.01)
(52) U.S. Cl. ........................................ 280/511; 280/504

(58) Field of Classification Search .................. 280/511, 280/504
See application file for complete search history.

(56) References Cited

U.S. PATENT DOCUMENTS

| 4,319,766 | A  | * | 3/1982  | Corteg et al. ............... 280/511 |
| 5,149,121 | A  | * | 9/1992  | Hafner ........................ 280/432 |
| RE35,961  | E  | * | 11/1998 | Wiebe ........................ 213/75 R |
| 6,053,521 | A  | * | 4/2000  | Schertler ....................... 280/511 |
| 6,722,684 | B1 | * | 4/2004  | McAllister ..................... 280/483 |
| 6,956,468 | B2 | * | 10/2005 | Lee et al. ...................... 340/431 |
| 7,017,701 | B2 | * | 3/2006  | Flynn et al. .................... 180/282 |
| 7,159,890 | B2 | * | 1/2007  | Craig et al. .................... 280/511 |

FOREIGN PATENT DOCUMENTS

| DE | 36 12 053 A1  | 10/1987 |
| DE | 102 11 572 A1 | 10/2003 |
| DE | 103 34 000 A1 | 2/2005  |
| EP | 1 796 926 B1  | 1/2009  |
| EP | 2 110 271 A1  | 10/2009 |
| EP | 2 110 272 A1  | 10/2009 |

* cited by examiner

*Primary Examiner* — Tashiana Adams
(74) *Attorney, Agent, or Firm* — Davis & Bujold, PLLC

(57) ABSTRACT

A towing device, for a towing vehicle, with a coupling shaft attached to the towing vehicle, a ball head mounted on the coupling shaft so that the ball head can rotate about a vertical axis, which can be coupled to a coupling counterpart of a trailer vehicle, and with an angle-measuring device by which rotation of the ball head about the vertical axis, relative to the coupling shaft, can be determined, and a force-measuring device by which force exerted by the ball head on the coupling shaft in the direction of the vertical axis can be determined.

11 Claims, 2 Drawing Sheets

TOWING DEVICE FOR A TOWING VEHICLE

This application is National Stage completion of PCT/DE2010/050081 filed Oct. 27, 2010, which claims priority from German patent application serial no. 10 2009 046 113.2 filed Oct. 28, 2009.

FIELD OF THE INVENTION

The invention concerns a towing device for a towing vehicle, with a coupling shaft attached to the towing vehicle, a ball head that can rotate about a vertical axis, which is supported on the coupling shaft and can be coupled to a coupling counterpart of a towed vehicle, and an angle-measuring device by means of which rotation of the ball head about the vertical axis relative to the coupling shaft can be determined.

BACKGROUND OF THE INVENTION

EP 1 796 926 B1 discloses a trailer coupling for a motor vehicle, comprising a tow bar with an arm and a ball socket provided with an opening, a ball swivel joint with a ball head and a bolt, such that the ball swivel joint is mounted so that it can rotate and swivel with the ball head in the ball socket and extends through the opening and projects out of the ball socket, and an angle-measuring device with a signal sender and two sensors, such that the angle-measuring device is arranged in a connection unit that comprises the ball socket and the ball head. The two sensors are arranged at a right-angle to one another, so that the angle-measuring device measures a torsion angle and a roll angle between the tow bar and the ball swivel joint.

From DE 103 34 000 A1 a trailer coupling for a towing vehicle is known, which comprises a coupling head for a coupling counterpart of a trailer vehicle, a coupling shaft which is attached to the towing vehicle and which defines a vertical axis in the area of the coupling head, and an angle sensor in the form of a magnetic field sensor which is integrated in the trailer coupling and which detects a relative movement of the coupling counterpart about the vertical axis of the coupling shaft and relative to the coupling shaft. The coupling head is mounted so that it can rotate relative to the coupling shaft and about the vertical axis thereof.

These angle sensors are used for maneuvering aides and trailer stabilization systems. However, for towing operations it is also desirable to know the support load exerted by the trailer, via the coupling counterpart, on the towing device. In particular, for risk-free towing operation a maximum admissible support load must not be exceeded, which is usually predetermined for the specific vehicle concerned.

At present, after a trailer has been loaded the support load is measured, for example, by requiring the driver to decouple the trailer and, with the aid of an auxiliary structure, to place the coupling counterpart on a weighing scale. Alternatively, support load balances integrated in the supporting wheel are available. In both cases, however, the trailer has to be decoupled and this entails not inconsiderable muscular effort.

SUMMARY OF THE INVENTION

Starting from there the purpose of the present invention is to provide simpler means of being able to determine the support load, in particular involving less effort.

The towing device according to the invention for a towing vehicle, in particular a motor vehicle, comprises a coupling shaft attached to the towing vehicle, a ball head mounted on the coupling shaft and able to rotate about a vertical axis, which can be coupled to a coupling counterpart of a trailer vehicle, an angle-measuring device by means of which rotation of the ball head about the vertical axis relative to the coupling shaft can be detected, and a force-measuring device by means of which a force exerted by the ball head on the coupling shaft in the direction of the vertical axis can be determined.

Thanks to the force-measuring device it is possible to measure the support load of the trailer vehicle in the coupled condition in which the support load is transferred by way of the coupling counterpart into the ball head of the towing device. Thus, it is no longer necessary to decouple the trailer vehicle for the purpose of determining the support load, so the muscular effort involved in doing that can be eliminated.

The angle-measuring device and the force-measuring device are preferably integrated in an assembly formed of the coupling shaft and the ball head. This gives a space-saving structure of the towing device.

In particular, the angle-measuring device and/or the force-measuring device is/are integrated in the coupling shaft.

Force-measuring devices are known from the prior art. For example, the ball head can be connected to the coupling shaft with the interposition of a piezoelectric force sensor. According to a design embodiment of the invention the force-measuring device comprises a spring and a displacement-measuring device, and the ball head is connected to the coupling shaft with the spring interposed. In particular, the ball head is guided so that it can move on the coupling shaft in the direction of the vertical axis. Thus, the ball head can move relative to the coupling shaft in the direction of the vertical axis against the force of the spring. By means of the displacement-measuring device the distance through which the ball head moves in the direction of the vertical axis relative to the coupling shaft can be determined. With a knowledge of the spring, specifically its spring constant, the support load can then be calculated by applying Hooke's law and if necessary allowing for any prestressing of the spring.

In the decoupled condition of the trailer vehicle the spring can be unstressed. It is preferable, however, for the spring to be under some prestress when the trailer vehicle is uncoupled. This prestress serves, for example, to avoid any rattling of the ball head and/or to set the working range of the spring in an optimum manner.

Preferably, the displacement-measuring device comprises a magnet as a first component and a magnetic-field-sensitive sensor as a second component, one of these components being connected fixed to the ball head and the other component fixed to the coupling shaft. When the trailer vehicle is coupled, the coupling counterpart presses onto the ball head and, as a function of the support load, pushes it down against the force of the spring. This changes the distance between the magnet and the magnetic-field-sensitive sensor, so that from the sensor a signal characterizing the support load can be obtained. The arrangement of the magnet and sensor is preferably chosen such that the magnet always remains within the detection range of the sensor, even if the distance between the magnet and sensor changes because of a support load variation. In particular, the magnet is connected fixed to the ball head and the magnetic-field-sensitive sensor to the coupling shaft. The magnet is preferably a permanent magnet. This makes it possible to avoid fitting electrical connections that extend across the rotary connection between the ball head and the coupling shaft.

In a further development of the invention, the magnetic-field-sensitive sensor is designed such that by means of the sensor, components of the magnetic field produced by the magnet in at least three different spatial directions can be detected. By virtue of such a sensor structure, in addition to the above-described displacement measurement rotation of the ball head about the vertical axis relative to the coupling shaft can be determined. Such a sensor is known for example from EP 0 947 846 B1. Thus the angle-measuring device and the force-measuring device are combined as a conjoint measuring device that comprises the magnet, the magnetic-field-sensitive sensor and the spring. In this way, compared with a force-measuring device separate from the angle-measuring device, a not inconsiderable saving of space and costs can be achieved.

Preferably, the magnetic-field-sensitive sensor is designed such that by virtue of three spatial field components of the magnetic field, the rotation angle of the magnet can be determined, for example by a tangent operation. Furthermore, the displacement undergone by the magnet against the force of the spring as a function of the supporting force, and thus the spring movement of the spring, can preferably be determined by a field component of the magnetic field that extends in the direction of the vertical axis. In this way the support load, which is proportional to or a linear function of the spring movement, can be determined.

The magnetization of the magnet is preferably orientated transversely or perpendicularly to the vertical axis. In particular the vertical axis runs centrally or approximately centrally through the magnet and/or between the outer pole ends of the magnet. In an embodiment of the invention the magnet is of cylindrical form and preferably magnetized diametrically. The sensor is preferably positioned a distance away from the magnet and, in particular, offset relative to it in the direction of the vertical axis.

With the towing device according to the invention, besides measuring the rotation angle of the ball head it is also possible to measure the support load. As a rule the rotation angle corresponds to the combination angle of a combination consisting of the towing vehicle and the towed trailer. An advantage of the invention compared with systems commonly available on the market is that the support load can be measured while the trailer is coupled.

BRIEF DESCRIPTION OF THE DRAWINGS

Below, the invention is described with reference to a preferred embodiment illustrated in the drawing, which shows.

DETAILED DESCRIPTION OF THE PREFERRED EMBODIMENTS

Figure 1:
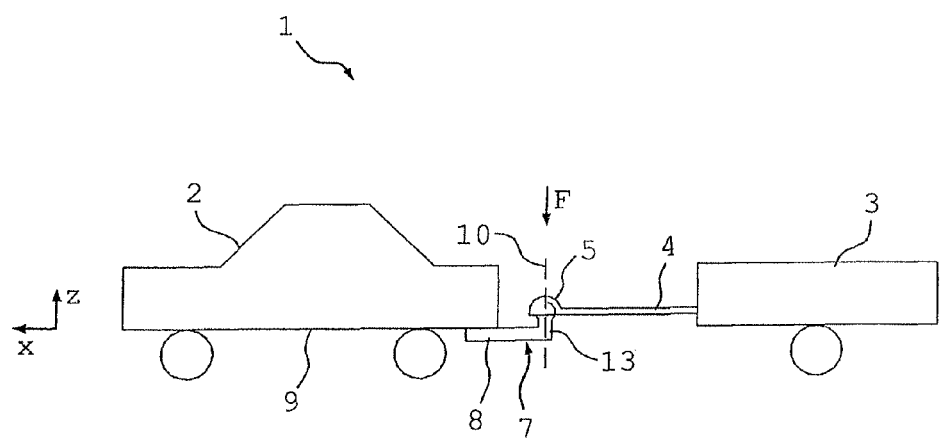
FIG. 1: A schematic side view of a towing vehicle/towed vehicle combination.

FIG. 1 shows a combination 1 consisting of a towing vehicle 2 and a trailer vehicle 3, which comprises a tow bar 4 with a coupling counterpart 5 in the form of a ball socket. The coupling counterpart 5 is coupled to a ball head 6 (see FIG. 3) of a towing device 7, which is attached by means of a coupling shaft 8 to the vehicle body 9 of the towing vehicle 2. By way of the coupling counterpart 5, the trailer 3 exerts a support load (force) in the direction of a vertical axis 10 upon the ball head 6 and thus on the towing device 7, the vertical axis 10 extending in the upward direction of the vehicle and through the mid-point M (see FIG. 3) of the ball head 6. Besides, the longitudinal direction x of the vehicle, which also characterizes the usual, forward-driving direction of the towing vehicle 2, is indicated by an arrow.

Figure 2:
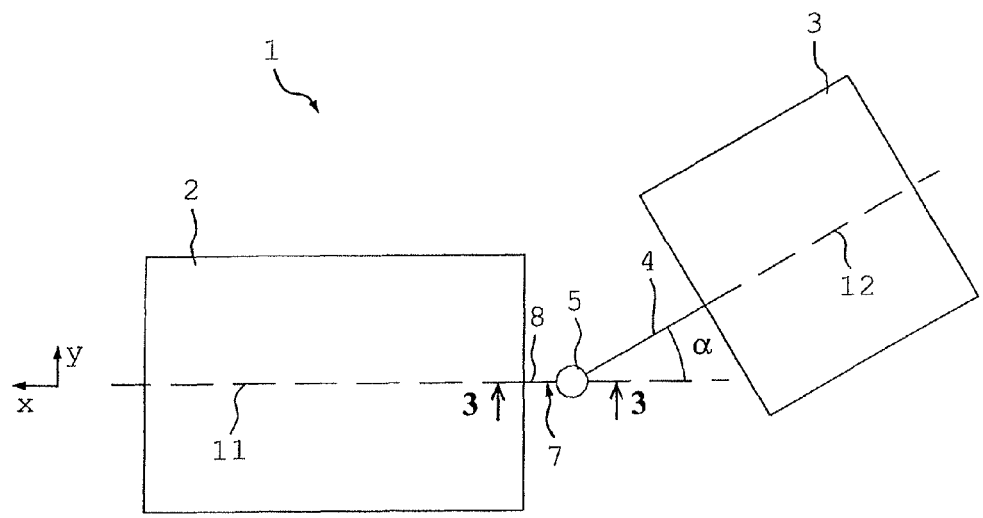
FIG. 2: A schematic view of the combination seen from above.

FIG. 2 shows a view of the combination 1 seen from above, in which the longitudinal axis 11 of the towing vehicle 2 forms a combination angle α with the longitudinal axis of the trailer vehicle 3. The direction y transverse to the vehicle is also shown.

Figure 3:
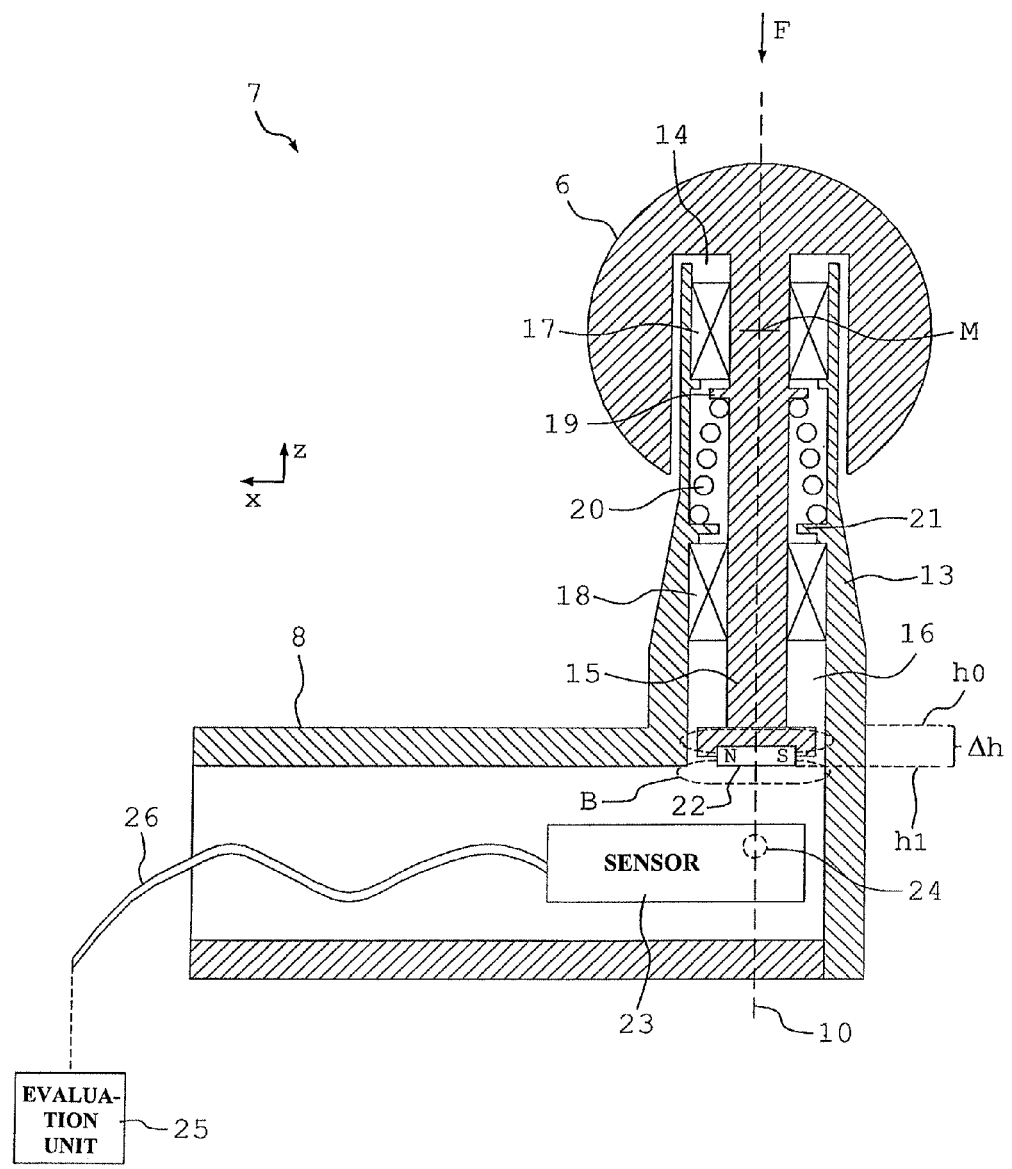
FIG. 3: A schematic and partial view of a towing device according to an embodiment of the invention, sectioned along the section line 3-3 in FIG. 2.

FIG. 3 shows a partial view of the towing device 7 sectioned along the section line 3-3 in FIG. 2, wherein the coupling shaft 8 has an upward-angled, rear end section 13 which extends in the direction of the vertical axis 10 and into an annular recess 14 provided in the ball head 6. At the center of the recess 14, a bolt 15 is provided which is connected fixed to the ball head 6 and engages in a recess 16 provided in the end section 13. By virtue of rotary bearings 17 and 18, the bolt 15 is mounted so that it can rotate on the end section 13, in such manner that the ball head 6 as well, since it is solidly fixed to the bolt 15, can also rotate about the vertical axis 10.

The bolt 15 has an annular, radially outward-directed projection 19 against which an upper end of a spring 20 is supported, the lower end of the spring being supported against an annular, radially inward-directed projection 21 of the end section 13. The bolt 15, and thus also the ball head 6, are guided to move in the direction of the vertical axis 10, so that if the support load F is sufficient the ball head 6 is pushed in the direction of the support load, against the force of the spring 20, relative to the end section 13.

To the lower end of the bolt 15 is fixed a permanent magnet 22 that is magnetized transversely to the vertical axis 10, as made clear by the marked poles N (north pole) and S (south pole). Offset relative to the magnet 22 in the direction of the vertical axis 10 is arranged a magnetic-field-sensitive sensor 23 by means of which, at a sensor location 24, components of the magnetic flux density B of the magnetic field in the x-direction, the y-direction and the z-direction can be measured.

From the component of the magnetic flux density B in the z-direction the height of the magnet 22 in the direction of the vertical axis 10 can be determined. If the height h1 of the magnet 22 when a support load F exists, compared with the height h0 of the magnet 22 in the absence of a support load, is different by an amount Δh, the change of the magnetic field at the sensor location 24 related to the distance Δh moved by the magnet 22 can also be determined by means of the sensor 23. Since the behavior of the spring 20 is known, the support load F can be calculated from the distance Δh.

Furthermore, by means of the sensor 23 rotation of the magnet 22 and thus also rotation of the ball head 6 relative to the end section 13 about the vertical axis 10 can also be determined. This is possible since the magnetization of the magnet is orientated transversely to the vertical axis 10 and the components of the magnetic flux density B in the x-direction and in the y-direction can be determined by the sensor 23. Since in the coupled condition, in relation to rotation about the vertical axis 10, the ball head 6 is connected in a rotationally fixed manner to the coupling counterpart 5, in particular by friction, the rotation angle of the ball head 6 about the vertical axis 10 relative to the end section 13 corresponds to the combination angle α. Thus, the combination angle a can be determined from the components of the magnetic flux density B in the x-direction and in the y-direction.

The support load F and the combination angle α are calculated by an evaluation unit 25 which is connected by at least one electric connection lead 26 to the magnetic-field-sensitive sensor 23. The evaluation unit 25 is, in particular, located inside the towing vehicle 2.

List of Indexes

1 Towing vehicle/towed vehicle combination
2 Towing vehicle
3 Towed vehicle
4 Tow bar
5 Coupling counterpart
6 Ball head
7 Towing device
8 Coupling shaft
9 Vehicle body of the towing vehicle
10 Vertical axis
11 Longitudinal axis of the towing vehicle
12 Longitudinal axis of the towed vehicle
13 End section of the coupling shaft
14 Annular recess in the ball head
15 Bolt
16 Recess in the end section
17 Rotary bearing
18 Rotary bearing
19 Projection on the bolt
20 Spring
21 Projection on the end section
22 Magnet
23 Magnetic-field-sensitive sensor
24 Sensor location
25 Evaluation unit
26 Connecting lead
z Vertical direction of the vehicle
x Longitudinal direction of the vehicle
y Transverse direction of the vehicle
F Support load
α Combination angle
M Mid-point of the ball head
B Magnetic flux density/magnetic field
h1 Height of the magnet under load
h0 Height of the magnet with no load
Δh Displacement/height difference

The invention claimed is:

1. A towing device for a towing vehicle, the towing device comprising:
a coupling shaft (8) attached to the towing vehicle (2),
a ball head (6) mounted on the coupling shaft (8) so that the ball head (6) being rotatable about a vertical axis (10), and the ball head (6) being couplable to a coupling counterpart (5) of a trailer vehicle (3),
an angle-measuring device (22, 23) by which rotation of the ball head (6) about the vertical axis (10), relative to the coupling shaft (8), being determinable,
a force-measuring device (20, 22, 23) by which a force (F) exerted by the ball head (6) on the coupling shaft (8) in a direction of the vertical axis (10) is determinable, and
the angle-measuring device (22, 23) and the force-measuring device (20, 22, 23) both being integrated into the coupling shaft (8).

2. A towing device for a towing vehicle, the towing device comprising:
a coupling shaft (8) attached to the towing vehicle (2),
a ball head (6) mounted on the coupling shaft (8) so that the ball head (6) being rotatable about a vertical axis (10), and the ball head (6) being couplable to a coupling counterpart (5) of a trailer vehicle (3),
an angle-measuring device (22, 23) by which rotation of the ball head (6) about the vertical axis (10), relative to the coupling shaft (8), being determinable, and
a force-measuring device (20, 22, 23) by which a force (F) exerted by the ball head (6) on the coupling shaft (8) in a direction of the vertical axis (10) is determinable,
wherein the force-measuring device comprises a spring (20) and a displacement-measuring device (22, 23) such that the ball head (6) is connected to the coupling shaft (8) with the spring (20) interposed against the spring force of which the ball head (6) is displacable in the direction of the vertical axis (10) relative to the coupling shaft (8), and a distance through which the ball head (6) moves, along the direction of the vertical axis (10) relative to the coupling shaft (8), is determinable by the displacement-measuring device (22, 23), and
the displacement-measuring device comprises a magnet (22) and a magnetic-field-sensitive sensor (23), one of the magnet (22) and the magnetic-field-sensitive sensor (23) is fixedly attached to the ball head (6) and the other of the magnet (22) and the magnetic-field-sensitive sensor (23) is fixedly attached the coupling shaft (8).

3. The towing device according to claim 2, wherein the magnet (22) is fixed to the ball head (6) and the magnetic-field-sensitive sensor (23) is fixed to the coupling shaft (8).

4. The towing device according to claim 2, wherein components of the magnetic field produced by the magnet (22) in at least three different spatial directions are detectable by the magnetic-field-sensitive sensor (23) such that rotation of the ball head (6), relative to the coupling shaft (8) about the vertical axis (10), is determinable.

5. The towing device according to claim 2, wherein magnetization of the magnet (22) is orientated transversely to the vertical axis (10).

6. The towing device according to claim 1, wherein the angle-measuring device (22, 23) and the force-measuring device (20, 22, 23) are combined in a conjoint measuring device.

7. A towing device for a towing vehicle, the towing device comprising:
a coupling shaft (8) being fixed to the towing vehicle (2), and the coupling shaft (8) comprising a hollow cylindrical end section (13) extending normal to the coupling shaft along a vertical axis (z);
a ball head (6) having a bolt (15) and being supported on the cylindrical end section (13) such that the bolt (15) extends coaxially with the vertical axis (10) within the cylindrical end section (13) of the coupling shaft (8), and the ball head (6) and the bolt (15) being rotatable around and axially slidable along the vertical axis (10) within the cylindrical end section (13), and the ball head (6) being couplable to a coupling counterpart (5) of a trailer vehicle (3);
an angle-measuring device (22, 23) for detecting rotation of the ball head (6) about a vertical axis (10) relative to the coupling shaft (8); and
a force-measuring device (20, 22, 23) for detecting movement of the ball head (6) relative to the coupling shaft (8) along the vertical axis (10).

8. The towing device according to claim 7, wherein the force-measuring device comprises a spring (20) and a displacement- measuring device (22, 23) such that the ball head (6) is connected to the coupling shaft (8) with the spring (20) interposed against the spring force of which the ball head (6) is displacable in a direction of the vertical axis (10) relative to the coupling shaft (8), and a distance through which the ball head (6) has moved, along the direction of the vertical axis (10) relative to the coupling shaft (8), is determinable by the displacement-measuring device (22, 23).

9. The towing device according to claim 8, wherein the displacement-measuring device comprises a magnet (22) and a magnetic-field-sensitive sensor (23), one of the magnet (22) and the magnetic-field-sensitive sensor (23) components is fixedly attached to the ball head (6) and the other of the magnet (22) and the magnetic-field-sensitive sensor (23) components is fixedly attached the coupling shaft (8).

10. The towing device according to claim 9, wherein the magnet (22) is fixed to the ball head (6) and the magnetic-field-sensitive sensor (23) is fixed to the coupling shaft (8).

11. The towing device according to claim 10, wherein components of the magnetic field produced by the magnet (22) in at least three different spatial directions are detectable by the magnetic-field-sensitive sensor (23) such that rotation of the ball head (6), relative to the coupling shaft (8) about the vertical axis (10), is determinable.

* * * * *